Patented Apr. 15, 1930

1,754,474

UNITED STATES PATENT OFFICE

ROBERT B. MacMULLIN AND MAURICE C. TAYLOR, OF NIAGARA FALLS, NEW YORK, ASSIGNORS TO THE MATHIESON ALKALI WORKS, INC., OF NEW YORK, N. Y., A CORPORATION OF VIRGINIA

PRODUCTION OF NEW HYPOCHLORITE COMPOSITIONS

No Drawing. Application filed December 29, 1928. Serial No. 329,308.

This invention relates to improvements in the production of the new hypochlorite compound described in the application filed by us August 16, 1928, Serial No. 300,148. The invention is a new process for producing this new product.

This new hypochlorite compound is a triple salt having a composition corresponding to the formula

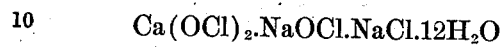

$Ca(OCl)_2.NaOCl.NaCl.12H_2O$

It is easily identified not only by analysis but also by its crystalline form and optical properties. The crystals belong to the hexagonal system and appear as hexagonal prisms with each edge bevelled. The crystals are anisotropic when viewed from the side and isotropic when viewed from the end.

We have found that this new triple salt can be produced by adding sodium chloride to chlorinated milk of lime under appropriate conditions of concentration and at a sufficiently low temperature. A small yield of the triple salt can be obtained by adding sodium chloride to chlorinated milk of lime of the proper concentration at a temperature of 0° C.; this yield increases rapidly as the temperature is lowered; at $-10°$ C. a yield exceeding 60% of the hypochlorite present can be obtained.

In producing the new hypochlorite compound, it is advantageous to avoid the presence of precipitated calcium hypochlorite di-hydrate in the chlorinated lime solution because such precipitated calcium hypochlorite di-hydrate transforms very slowly to the new triple salt upon addition of sodium chloride. Chlorinated lime solutions free from precipitated calcium hypochlorite di-hydrate can be produced by different methods of procedure.

For example, the chlorination of milk of lime may be carried to completion while maintaining the solution undergoing chlorination at a temperature below that value above which calcium hypochlorite di-hydrate tends to precipitate in substantial amount during the chlorination. A chlorinated solution supersaturated with respect to calcium hypochlorite di-hydrate but comparatively stable at temperatures not exceeding 10° C. may be so produced by carrying out the chlorination at a temperature not exceeding 10° C. or by carrying out the chlorination initially at a higher temperature and cooling the solution to a temperature not exceeding 10° C. before the chlorination has reached a point at which calcium hypochlorite di-hydrate tends to precipitate in substantial amount, and then completing the chlorination.

As another example, milk of lime may be chlorinated to a concentration short of that at which calcium hypochlorite di-hydrate will precipitate on any addition of sodium chloride, the sodium chloride to be added in carrying out the process of the invention then added, and then adding additional lime and completing the chlorination while maintaining a low temperature, not exceeding about 0° C.

The invention will be further illustrated by the following more detailed example, but it will be understood that the invention is not limited thereto.

For example:—74 parts (by weight) of calcium hydroxide ($Ca(OH)_2$) and 240 parts of water are partially chlorinated with 50 to 55 parts of chlorine at 20 to 25° C., this solution is then cooled to a temperature between 5° C. and 10° C. or lower, and the chlorination completed with enough more chlorine to make a total of 71 parts of chlorine. This chlorinated solution is then cooled to $-10°$ C. or a somewhat lower temperature and 46 parts of finely ground sodium chloride are thoroughly stirred in. After five to ten minutes stirring, spontaneous crystallization of the triple salt may occur, if not the mixture is seeded with crystals of the new triple salt, the stirring is then continued while the low temperature is maintained as the new triple salt crystallizes and precipitates. The crystals can be separated from the mother liquor by centrifuging or filter pressing. The mother liquor remaining after separation of the new triple salt can be treated with lime for recovery of its available chlorine in the form of basic hypochlorite and this basic hypochlorite can be used in a subsequent chlorination in carrying out the process of the invention. A yield of the new triple salt corresponding to 60-70% of the hypochlorite present is obtained.

The new triple salt so obtained can itself be employed, for example, for bleaching purposes, as where it is to be used at the place it is produced or before it has had an opportunity of undergoing decomposition. In order to protect it against decomposition it should be maintained at a low temperature, not exceeding 22° C. Or, the new triple salt so obtained can be converted into a stable calcium hypochlorite product in the manner described in the application filed by us August 16, 1928, Serial No. 300,148, above mentioned.

One of the advantages of this invention is that it provides for the production of the new triple salt without requiring raw materials other than lime, chlorine and sodium chloride. The use of caustic soda is made unnecessary; the lime slurry chlorinated in carrying out the invention may be free from sodium hydroxide.

We claim:

1. The method of producing a new hypochlorite compound which comprises chlorinating milk of lime while maintaining the temperature of the solution undergoing chlorination below that value at which calcium hypochlorite di-hydrate tends to precipitate in substantial amount during the chlorination and adding sodium chloride to this chlorinated solution while maintaining the solution at a temperature not substantially exceeding 0° C. to precipitate a triple salt of calcium hypochlorite, sodium hypochlorite and sodium chloride.

2. The method of producing a new hypochlorite compound which comprises chlorinating milk of lime while maintaining the temperature of the solution undergoing chlorination below that value at which calcium hypochlorite di-hydrate tends to precipitate in substantial amount during the chlorination, and adding sodium chloride to this chlorinated solution while maintaining the solution at a temperature not substantially exceeding $-10°$ C. to precipitate a triple salt of calcium hypochlorite, sodium hypochlorite and sodium chloride.

3. The method of producing a new hypochlorite compound which comprises chlorinating milk of lime at a temperature exceeding about 10° C. to a point short of that at which calcium hypochlorite di-hydrate tends to precipitate in substantial amount during the chlorination, cooling the partially chlorinated slurry to a temperature not substantially exceeding 10° C. and completing the chlorination, and adding sodium chloride to this chlorinated slurry while maintaining the slurry at a temperature not substantially exceeding 0° C. to precipitate a triple salt of calcium hypochlorite, sodium hypochlorite and sodium chloride.

4. The method of producing a new hypochlorite compound which comprises chlorinating milk of lime substantially free from sodium hydroxide while maintaining the temperature of the solution undergoing chlorination below that value at which calcium hypochlorite di-hydrate tends to precipitate in substantial amount during the chlorination and adding sodium chloride to this chlorinated solution while maintaining the solution at a temperature not substantially exceeding 0° C. to precipitate a triple salt of calcium hypochlorite, sodium hypochlorite and sodium chloride.

5. The method of producing a new hypochlorite compound which comprises adding sodium chloride to a chlorinated lime solution containing calcium hypochlorite and calcium chloride and free from any substantial amount of precipitated calcium hypochlorite di-hydrate while maintaining the solution at a temperature not substantially exceeding 0° C. to precipitate a triple salt of calcium hypochlorite, sodium hypochlorite and sodium chloride.

6. The method of producing a new hypochlorite compound which comprises adding sodium chloride to a chlorinated lime solution containing calcium hypochlorite and calcium chloride and free from any substantial amount of precipitated calcium hypochlorite di-hydrate while maintaining the solution at a temperature not substantially exceeding $-10°$ C. to precipitate a triple salt of calcium hypochlorite, sodium hypochlorite and sodium chloride.

7. The method of producing a new hypochlorite compound which comprises chlorinating milk of lime to a point short of that at which calcium hypochlorite di-hydrate will precipitate on any addition of sodium chloride, adding sodium chloride to this chlorinated solution, then adding additional lime to the solution and completing the chlorination.

8. The method of producing a new hypochlorite compound which comprises adding sodium chloride to a chlorinated lime solution containing calcium hypochlorite and calcium chloride while maintaining the solution at a temperature not substantially exceeding 0° C. to precipitate a triple salt of calcium hypochlorite, sodium hypochlorite and sodium chloride.

9. The method of producing a new hypochlorite compound which comprises adding sodium chloride to a chlorinated lime solution containing calcium hypochlorite and calcium chloride while maintaining the solution at a temperature not substantially exceeding $-10°$ C. to precipitate a triple salt of calcium hypochlorite, sodium hypochlorite and sodium chloride.

In testimony whereof we affix our signatures.

ROBERT B. MacMULLIN.
MAURICE C. TAYLOR.